Figure 1:
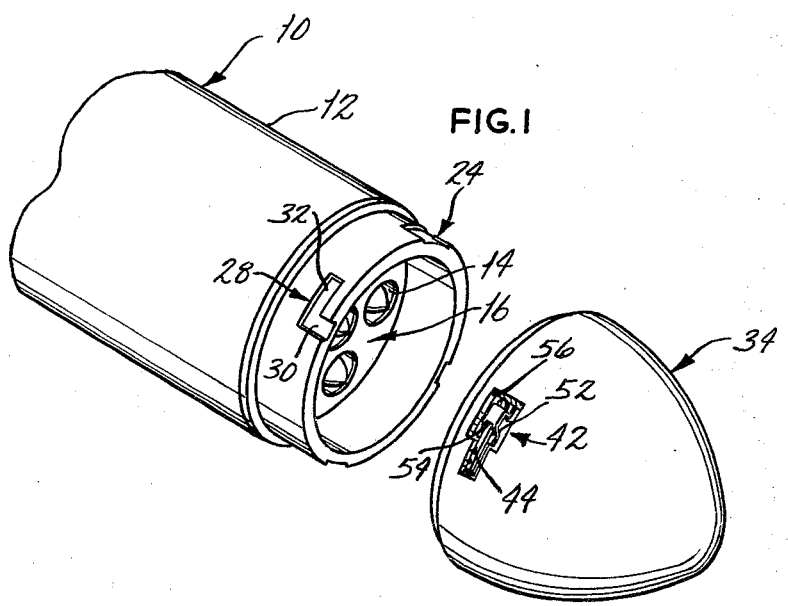

United States Patent

Nash

[15] 3,670,621
[45] June 20, 1972

[54] ROCKET LAUNCHER FAIRING

[72] Inventor: John J. Nash, Ferguson, Mo.

[73] Assignee: Alsco, Inc., St. Louis, Mo.

[22] Filed: Oct. 31, 1969

[21] Appl. No.: 872,842

[52] U.S. Cl. .............................................. 89/1.8, 89/1.817
[51] Int. Cl. ........................................................ F41f 3/06
[58] Field of Search ............... 89/1.806, 1.807, 1.816, 1.818

[56] References Cited

UNITED STATES PATENTS

| 3,362,291 | 1/1968 | De Luca | 89/1.817 |
| 2,844,073 | 7/1958 | Re et al. | 89/1.807 |
| 3,031,932 | 5/1962 | Fite, Jr. | 89/1.806 |
| 3,048,086 | 8/1962 | Robert et al. | 89/1.817 |
| 3,106,863 | 10/1963 | Robert et al. | 89/1.817 |
| 3,315,565 | 4/1967 | Nash | 89/1.816 |

*Primary Examiner*—Samuel W. Engle
*Attorney*—John D. Pope, III

[57] ABSTRACT

A rocket launcher fairing is adapted for use with an elongated rocket launcher having at least one rocket tube containing a rocket. The fairing includes a rim adapted to fit on one end of the launcher, securing means on the rim for detachably securing it to the launcher, and a polystyrene shell foamed in place around the rim so that it adheres to the rim. The shell forms a rounded surface which encloses the end of the launcher and which is adapted to shatter and break in response to the impact from the rockets when they exit from the tubes.

17 Claims, 3 Drawing Figures

INVENTOR
JOHN J. NASH
BY
ATTORNEY

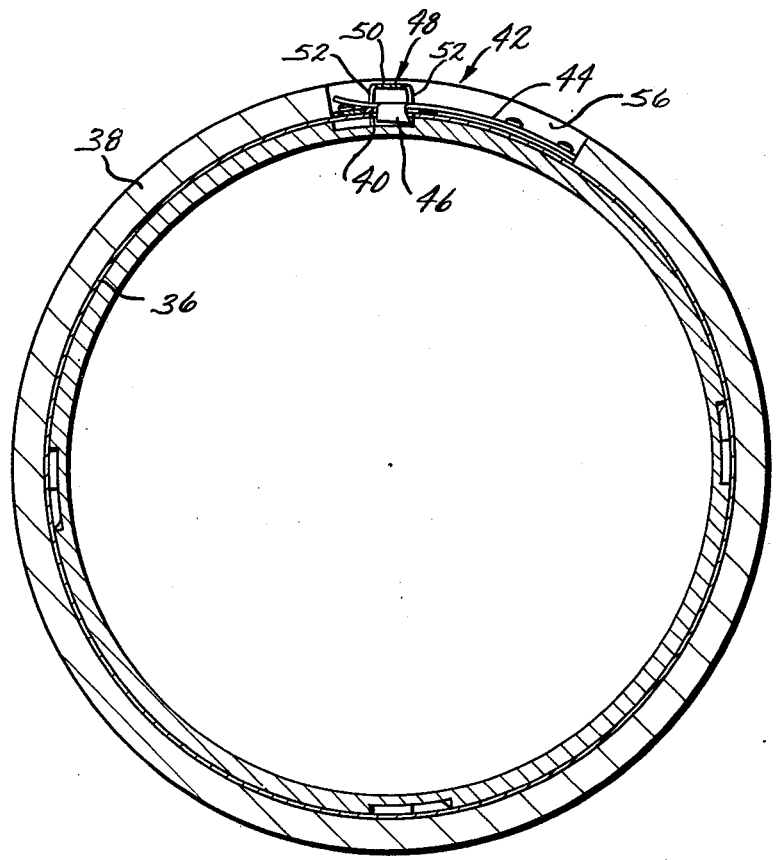

ROCKET LAUNCHER FAIRING

This invention relates to rocket launchers and more specifically to frangible rocket launcher fairings which are secured over the ends of rocket launchers.

Rocket launchers generally include a cylindrical bundle of tubes adapted to carry rockets. The bundle is suspended beneath an aircraft and the rockets are fired from the launcher during flight of the aircraft. These rocket launchers are used on all types of aircraft, including helicopters, propeller driven craft and jet propelled aircraft. Because the rocket launchers are bulky and are suspended beneath the aircraft, they present considerable wind resistance during flight. In order to limit this wind resistance, fairings are secured over the ends of the launchers to make them more streamlined. Some of these fairings are made of frangible materials which shatter when the rockets exit from the launcher. These frangible fairings are usually made of a thin, brittle resinous material which when shattered creates a serious hazard for the aircraft. The small shattered resinous particles fly through the air, sometimes striking the aircraft and occasionally puncturing the surface thereof. These brittle resinous particles also can cause considerable damage to a jet engine when taken in through the air intake.

The resinous material presently being used on rocket launcher fairings is quite thin (approximately one-sixteenth of an inch) and provides no means for recessing the clips used to secure the fairing to the rocket launcher. Consequently the clips protrude outwardly from the surface of the fairing and increase the wind resistance of the rocket launcher. Furthermore, when the wind strikes these clips it sometimes causes them to vibrate. This vibration may cause the fairing to become detached from the launcher during flight of the airplane.

Another disadvantage of the resinous type fairings is that they must be riveted to an annular rim adapted to embrace the outer surface of the rocket launcher. Securing the resinous fairing to this rim with rivets is a time-consuming and expensive process in the manufacture of rocket fairings. Since these fairings are destroyed during use they must be capable of quick, inexpensive and efficient manufacture.

The fairing of this invention is constructed of a polystyrene material. Because of its light weight, the polystyrene shell can be made thicker than previously used resinous shells without adding to the weight. The clip is recessed within this thicker shell so as to streamline the fairing and prevent vibration of the clip in response to the airstream passing over the fairing during flight. The polystyrene material is superior to previously used resinous material in that it is soft and does not cause damage to the aircraft or to the jet engine of the aircraft. Furthermore, the heat from the rockets as they exit from the launcher causes a substantial amount of the polystyrene fairing to disintegrate, thereby greatly reducing the number of particles which fly into the air during the firing of the rockets. The polystyrene shell can be foamed in place around the annular metal rim so that it will adhere thereto without need for the rivets of the previous devices.

Among the several objects of the present invention may be noted the provision of a rocket launcher fairing which is frangible and which breaks easily in response to impact from the exiting rockets; the provision of a rocket launcher fairing which is constructed of material which will be partially disintegrated by the heat from the rocket as it exits; the provision of a rocket launcher fairing constructed of soft material which will not damage the aircraft when striking it during high seed flights; the provision of a rocket launcher fairing which is thicker than other frangible fairings so that securing means can be recessed in the outer surface of the fairing; the provision of a rocket launcher fairing having a securing clip which does not vibrate in response to the airstream passing over the fairing during high speed flights; the provision of a rocket launcher fairing which is light in weight; the provision of a rocket launcher fairing including a shell secured to a metal rim without the necessity of rivets; and the provision of a rocket launcher fairing which is economical to manufacture. Other objects and features will be in part apparent and in part pointed out hereinafter.

The invention accordingly comprises the constructions hereinafter described, the scope of the invention being indicated in the following claims.

Figure 2:
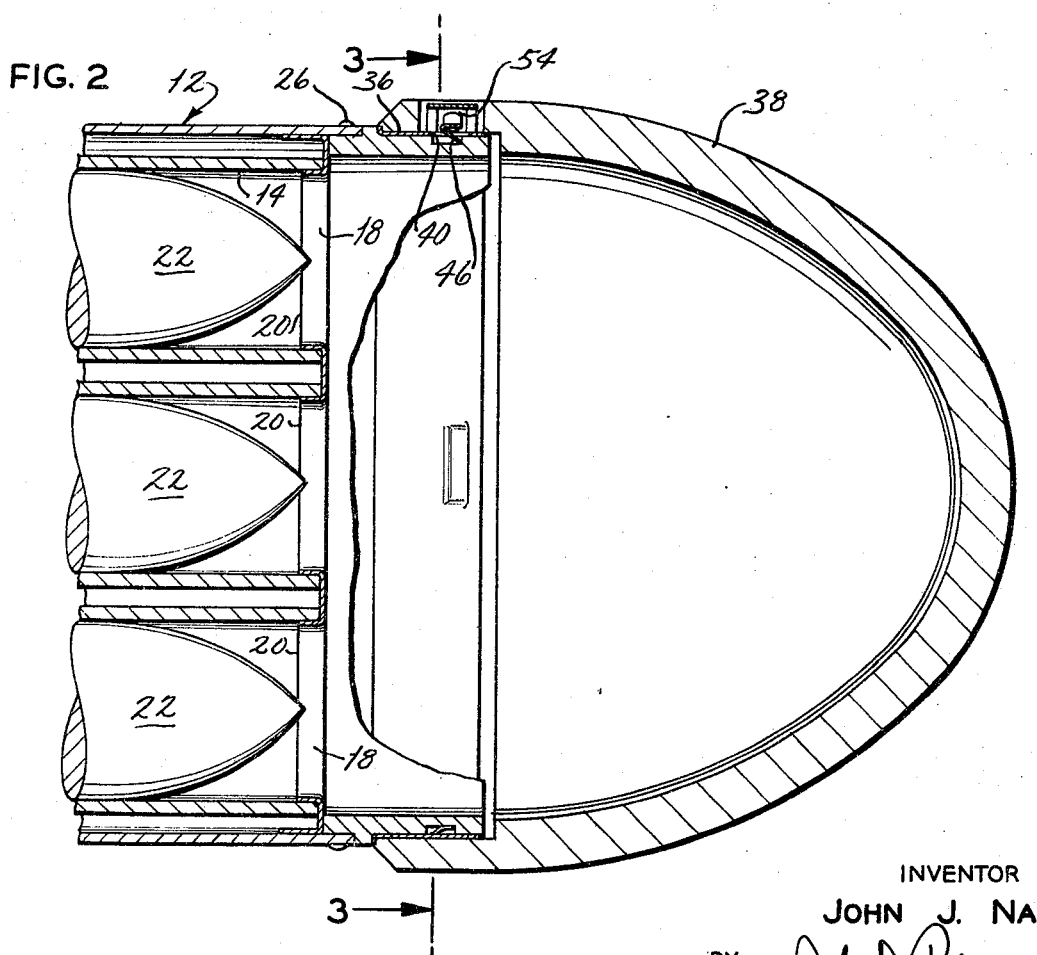

In the accompanying drawings, in which one of various possible embodiments of the invention is illustrated, FIG. 1 is a perspective view showing the end of a rocket launcher and showing the fairing adapted to be secured thereto;

FIG. 2 is a sectional view of a rocket launcher having the fairing secured over one of its ends, portions of the rocket launcher being broken away to show the rim on the inside of the fairing; and FIG. 3 is a sectional view taken along line 3—3 of FIG. 2.

Corresponding reference characters indicate corresponding parts throughout the several views of the drawings.

Rocket launcher 10 includes a cylindrical skin 12 surrounding a bundle of cylindrical elongated rocket tubes 14. A bulkhead 16 includes an array of apertures 18 which are positioned in registered alignment with the ends of tubes 14. Each aperture 18 includes an annular collar 20 which projects axially inside the end of one rocket tube 14. Within each tube 14 is a rocket 22 adapted to be fired when ignited by an electrical signal from the cockpit of the aircraft.

A cylindrical latch collar 24 is secured to the end of cylindrical skin 12 by a plurality of screws 26. Cut within the outer surface of latch collar 24 are a plurality of L-shaped bayonet slots 28, each of which includes an axially extending leg 30 and a circumferentially extending leg 32.

A rocket launcher fairing 34 includes an annular metal rim 36 and a polystyrene shell 38 which is in the shape of a paraboloid. Rim 36 conforms to the outer surface of latch collar 24 and includes a rectangular aperture 40 therein. A latch mechanism 42 is mounted on the outer surface of rim 36 and includes a spring arm 44 rigidly secured to rim 36 at one of its ends. At the other end of spring arm 44 is a catch finger 46 which protrudes radially inwardly through aperture 40. Riveted or otherwise securely mounted upon the external surface of rim 36 in overlying relation to catch finger 46 is a U-shaped metal guide 48 integrally including a solid flat rectilinear top plate 50 and legs 52, the latter being suitably provided with slots 54 through which spring arm 44 extends. Spring arm 44 yieldably presses catch finger 46 radially inwardly with respect to the cylindrical axis of launcher 10.

Shell 38 is foamed in place around rim 36 so that it will adhere thereto without requiring rivets or other securing means. While it is shown in the shape of a paraboloid it may also be shaped otherwise as, for example, in the shape of a hemisphere or a cone. The density of the polystyrene is preferably approximately 5 lbs.per cubic foot so that shell 38 can have a thickness of approximately one-half inch without adding substantially to the weight of the rocket launcher. A recess 56 is provided in shell 38 around latch mechanism 42. The thickness of shell 38 at this point is greater than the distance which latching mechanism 42 protrudes out from rim 36 so that latching mechanism 42 is fully recessed within shell 38. Because latching mechanism 42 is fully recessed, it is not exposed to the airstream passing by the rocket launcher during the flight of the aircraft and consequently the rocket launcher is more streamlined. Furthermore, this recessed arrangement prevents the wind from causing the latching mechanism to vibrate. When fairing 34 is secured to the end of rocket launcher 10 (FIG. 2) catch finger 46 of latching mechanism 42 fits within circumferentially extending leg 32 of bayonet slot 28, thereby detachably holding fairing 34 to rocket launcher 10.

In operation, rocket launcher 10 is suspended beneath an aircraft with fairing 34 detachably secured over its forward end. When the rockets exit from tubes 14 they strike and puncture the polystyrene material of which shell 38 is constructed. As rockets 22 leave launcher 10 the heat which they produce partially disintegrates the broken particles of shell 38.

Particles which are not disintegrated are carried away by the airstream passing by the rocket launcher. Unlike the broken particles of present brittle resinous rocket launcher fairings, however, these polystyrene particles are soft and cause no appreciable damage to the aircraft or to the jet engines of the aircraft.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A rocket launcher fairing for use with an elongated rocket launcher, said fairing comprising a hollow shell having a rounded streamlined surface, said shell being open at one end and formed of a low-density frangible material, an annular rim conforming substantially to said shell opening, said rim being secured to the inner hollow surface of said shell, and securing means mounted on said rim and recessed from the outer streamlined surface of said shell, and wherein said fairing shell includes cutout portions over said annular rim, said securing means protruding radially outwardly from said rim into said cutout portion, the outermost protrusion of said securing means being recessed from the outer streamlined surface of said shell, said open end of said shell formed to accomodate the end of said rocket launcher such that said securing means engages said rocket launcher for detachable affixation of said fairing to said launcher.

2. The rocket launcher fairing of claim 1 wherein said securing means includes a latching aperture in said annular rim and a resilient latch secured to said rim and extending into said aperture for engagement with complementary latching means on said rocket launcher.

3. The rocket launcher fairing of claim 1 wherein said shell is in the shape of a paraboloid.

4. The rocket launcher fairing of claim 1 wherein said fairing shell is formed of polystyrene foam formed in place around said annular rim for adherence thereto.

5. The rocket launcher fairing of claim 4 wherein said polystyrene has a density of approximately 5 lbs. per cubic foot.

6. The rocket launcher fairing of claim 1 wherein said annular rim is recessed within the inner shell wall below the streamlined surface of said fairing.

7. The rocket launcher fairing of claim 1 wherein said shell includes an annular recess at said shell opening within the inner wall portion of said fairing shell, said annular rim being secured to said shell at said annular recess.

8. The rocket launcher fairing of claim 7 wherein said annular rim is disposed intermediate said fairing shell and said rocket launcher in mounted position of said fairing on said rocket launcher.

9. The rocket launcher fairing of claim 1 wherein said securing means is spaced from said fairing shell.

10. A rocket launcher fairing for use with an elongated rocket launcher, said fairing comprising a hollow shell having a rounded streamlined surface, said shell being open at one end and formed of a low-density frangible material, an annular rim conforming substantially to said shell opening, said rim being secured to the inner hollow surface of said shell, and securing means mounted on said rim and recessed from the outer streamlined surface of said shell, said open end of said shell formed to accomodate the end of said rocket launcher such that said securing means engages said rocket launcher for detachable affixation of said fairing to said launcher, said securing means including a latching aperture in said annular rim and a resilient latch secured to said rim and extending into said aperture for engagement with complementary latching means on said rocket launcher.

11. The rocket launcher fairing of claim 10 wherein said shell is in the shape of a paraboloid.

12. The rocket launcher fairing of claim 10 wherein said fairing shell is formed of polystyrene foam formed in place around said annular rim for adherence thereto.

13. The rocket launcher fairing of claim 12 wherein said polystyrene has a density of approximately 5 pounds per cubic foot.

14. The rocket launcher fairing of claim 10 wherein said annular rim is recessed within the inner shell wall under the streamlined surface of said fairing.

15. The rocket launcher fairing of claim 10 wherein said shell includes an annular recess at said shell opening within the inner wall portion of said fairing shell, said annular rim being secured to said shell at said annular recess.

16. The rocket launcher fairing of claim 15 wherein said annular rim is disposed intermediate said fairing shell and said rocket launcher in mounted position of said fairing on said rocket launcher.

17. The rocket launcher fairing of claim 10 wherein said securing means is spaced from said fairing shell.

* * * * *